(12) United States Patent
Shibayama et al.

(10) Patent No.: US 12,369,587 B2
(45) Date of Patent: *Jul. 29, 2025

(54) AQUEOUS COMPOSITION OF EPYRIFENACIL, FLUMIOXAZIN AND PYROXASULFONE

(71) Applicant: Valent U.S.A. LLC, San Ramon, CA (US)

(72) Inventors: Takashi Shibayama, Dublin, CA (US); Ke Zhou, San Ramon, CA (US)

(73) Assignee: VALENT U.S.A., LLC, San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,856

(22) Filed: Nov. 30, 2021

(65) Prior Publication Data
US 2022/0167621 A1 Jun. 2, 2022

Related U.S. Application Data
(60) Provisional application No. 63/120,234, filed on Dec. 2, 2020.

(51) Int. Cl.
*A01N 47/38* (2006.01)
*A01N 25/04* (2006.01)
*A01N 43/80* (2006.01)
*A01N 43/84* (2006.01)

(52) U.S. Cl.
CPC .............. *A01N 47/38* (2013.01); *A01N 25/04* (2013.01); *A01N 43/80* (2013.01); *A01N 43/84* (2013.01)

(58) Field of Classification Search
CPC ........ A01N 47/38; A01N 25/04; A01N 43/80; A01N 43/84; A01N 43/54; A01P 13/00

USPC .......................................................... 504/136
See application file for complete search history.

(56) References Cited

U.S. PATENT DOCUMENTS

| | | | |
|---|---|---|---|
| 3,645,716 A | 2/1972 | Rutkowski | |
| 8,461,080 B2 | 6/2013 | Sixl et al. | |
| 2008/0153706 A1 | 6/2008 | Frisch et al. | |
| 2018/0125073 A1* | 5/2018 | Burkhart | A01N 25/30 |
| 2019/0142006 A1 | 5/2019 | Sada | |
| 2019/0200604 A1* | 7/2019 | Tanaka | A01N 25/02 |
| 2021/0022345 A1* | 1/2021 | Winter | A61K 8/732 |
| 2022/0159960 A1* | 5/2022 | Yokoyama | A01P 13/00 |

FOREIGN PATENT DOCUMENTS

| | | |
|---|---|---|
| ES | 2430813 T3 | 11/2013 |
| WO | WO-2020166477 A1 * | 8/2020 |

OTHER PUBLICATIONS

International Search Report and Written Opinion dated Jul. 1, 2022.
Wang et al. "Effects of xanthan gum on atomization and deposition characteristics in water and Silwet 408 aqueous solution." International Journal of Agricultural and Biological Engineering. vol. 11. Issue 3. pp. 29-34. May 2018 [Retrieved Jan. 27, 2022] Retrieved from Internet: <D0'1:10.25165Jj.ijabe.20181103.3802>, entire document, especially p. 30.

* cited by examiner

*Primary Examiner* — Benjamin J Packard
*Assistant Examiner* — Lucy M Tien
(74) *Attorney, Agent, or Firm* — Wood, Phillips, Katz, Clark & Mortimer

(57) ABSTRACT

The present invention is directed to an aqueous composition comprising a mixture of epyrifenacil, flumioxazin and pyroxasulfone. The present invention is further directed to methods of controlling weeds by applying the compositions of the present invention to a weed or an area in need of weed control.

15 Claims, No Drawings

AQUEOUS COMPOSITION OF EPYRIFENACIL, FLUMIOXAZIN AND PYROXASULFONE

FIELD OF THE INVENTION

The present invention is directed to an aqueous composition comprising a mixture of epyrifenacil, flumioxazin and pyroxasulfone. The present invention is further directed to methods of controlling weeds by applying the compositions of the present invention to a weed or an area in need of weed control.

BACKGROUND OF THE INVENTION

Unwanted plants, such as weeds, reduce the amount of resources available to crop plants and can have a negative effect on crop plant yield and quality. For example, a weed infestation reportedly was responsible for an 80% reduction in soybean yields. Bruce, J. A., and J. J. Kells, *Horseweed (Conyza Canadensis) control in no-tillage soybeans (Glycine max) with preplant and preemergence herbicides*, Weed Technol. 4: 642-647 (1990). Therefore, controlling weeds is a major concern of crop growers. Unwanted plants in crop plant environments include broadleaves, grasses and sedges.

Epyrifenacil is a protoporphyrinogen oxidase ("PPO") inhibitor, that primarily controls broadleaf weeds. PPO inhibitors create highly toxic molecules upon contact with the weed that result in destruction of plant tissue. PPO inhibitors are also effective against some grasses. Epyrifenacil is difficult to formulate in aqueous compositions. Current methods include dissolving epyrifenacil in an organic solvent.

Flumioxazin is a PPO inhibitor. Flumioxazin has very low water solubility. Flumioxazin is used to control weeds among soybeans, peanuts, orchard fruits and many other agricultural crops in the United States and worldwide.

Pyroxasulfone is a relatively new isooxazoline herbicide that inhibits synthesis of very-long-chain fatty acids. Pyroxasulfone has very low water solubility. Pyroxasulfone is used to control weeds among many agricultural crops including corn and soybean.

These herbicides are likely to have compatibility issues when mixed together in an aqueous composition. However, aqueous compositions have many advantages including high flash point, low oil content, and low cost of packaging and transportation. In addition, these herbicides are not physically compatible with high electrolyte systems such as RoundUp Powermax® (available from Monsanto Technology LLC).

RoundUp Powermax® has become widely used in areas in need of weed control. For example, there are many varieties of agricultural crops, such as soybeans, corn, cotton and wheat that are resistant to Roundup Powermax® making its use to control weeds among these crops ideal. However, the significant increase in the area where glyphosate is applied leads to an increase in the potential infestation of glyphosate-resistance weeds. For controlling glyphosate-resistant weeds, Roundup Powermax® is often added to tank mixes of other herbicidal formulations having a different mode of action.

Thus, there is a need in the art for aqueous compositions containing epyrifenacil, flumioxazin and pyroxasulfone that remain stable and that are compatible with high electrolyte systems.

SUMMARY OF THE INVENTION

In one embodiment, the present invention is directed to an aqueous composition comprising epyrifenacil, flumioxazin and pyroxasulfone.

In another embodiment, the present invention is directed to an aqueous composition comprising epyrifenacil, flumioxazin, pyroxasulfone and one or more excipients selected from the group consisting of one or more solvents, one or more surfactants and one or more thickeners.

In another embodiment, the present invention is directed to a method of controlling a weed comprising applying a composition of the present invention to the weed or an area in need of weed control.

DETAILED DESCRIPTION OF THE INVENTION

Applicant discovered an aqueous composition that is stable despite containing three actives that have low to very low water solubility, namely epyrifenacil, flumioxazin (1.79 ppm) and pyroxasulfone (3.49 ppm). Specifically, the Applicant discovered compositions capable of creating stable oil-in-water emulsion of epyrifenacil and stable suspension concentrates of flumioxazin and pyroxasulfone that remain stable when combined in a final aqueous composition. Further, Applicant discovered aqueous compositions containing epyrifenacil, flumioxazin and pyroxasulfone that are physically compatible with high electrolyte systems.

In one embodiment, the present invention is directed to an aqueous composition comprising epyrifenacil, flumioxazin and pyroxasulfone.

Epyrifenacil is a protoporphyrinogen oxidase inhibitor having CAS #353292-31-6 and IUPAC name ethyl [(3-{2-chloro-5-[3,6-dihydro-3-methyl-2,6-dioxo-4-(trifluoromethyl)pyrimidin-1(2H)-yl]-4-fluorophenoxy}-2-pyridyl)oxy]acetate. Epyrifenacil has the following chemical structure:

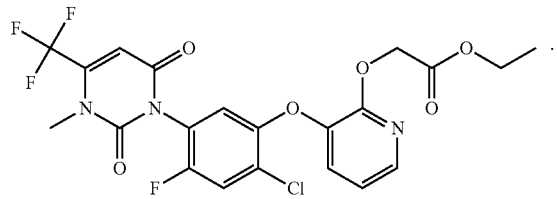 [SMILES: CCOC(=O)COc1ncccc1Oc1cc(-n2c(=O)cc(C(F)(F)F)n(C)c2=O)c(F)cc1Cl]

Epyrifenacil may be present in compositions of the present invention at a concentration from about 0.1% to about 10% w/w, preferably from about 0.5% to about 5% w/w, more preferably from about 0.5% to about 2% w/w and most preferably at about 1% w/w.

Flumioxazin is a is a protoporphyrinogen oxidase inhibitor having CAS #103361-09-7 and IUPAC name 2-(7-fluoro-3-oxo-4-prop-2-ynyl-1,4-benzoxazin-6-yl)-4,5,6,7-tetrahydroisoindole-1,3-dione. Flumioxazin has the following chemical structure:

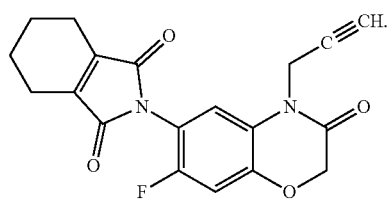 [SMILES: C#CCN1C(=O)COc2cc(F)c(N3C(=O)C4=C(CCCC4)C3=O)cc21]

Flumioxazin may be present in compositions of the present invention at a concentration from about 1% to about 10% w/w, preferably from about 2% to about 8% w/w, more preferably from about 4% to about 6% w/w and most preferably at about 5% w/w.

Pyroxasulfone is a very long chain fatty acid synthesis inhibitor having CAS #447399-55-5 and IUPAC name 3-[[5-(difluoromethoxy)-1-methyl-3-(trifluoromethyl)pyrazol-4-yl]methylsulfonyl]-5,5-dimethyl-4H-1,2-oxazole. Pyroxasulfone has the following chemical structure:

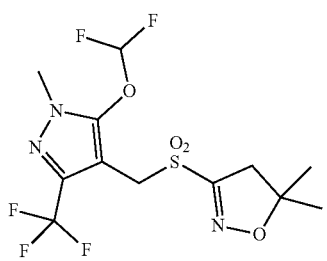

Pyroxasulfone may be present in compositions of the present invention at a concentration from about 1% to about 10% w/w, preferably from about 2% to about 8% w/w, more preferably from about 4% to about 6% w/w and most preferably at about 5% w/w.

Compositions of the present invention contain water.

In a preferred embodiment, the aqueous compositions of the present invention are in the form of a suspo-emulsion. Suspo-emulsions are a mixture of water-insoluble active ingredients dispersed in an aqueous solution, where one (or more) of the active ingredients is in suspension form and one (or more) of the active ingredients is in emulsion form.

In a more preferred embodiment, flumioxazin and pyroxasulfone are in suspension form and hydrophobic organic solvent in which epyrifenacil is dissolved is in emulsion form.

In another preferred embodiment, the aqueous composition of the present invention has a pH from about 4 to about 9, preferably from about 5 to about 9, more preferably from about 5 to about 8 and most preferably at about 5.5 or 7.5.

In another preferred embodiment, the particle size of the dispersed and emulsified microparticle in compositions of the present invention is within the range of about 10 μm or less, preferably from about 0.1 to about 10 and more preferably from about 0.2 to about 5 μm. The particle size as described herein represents a volume median diameter. The volume median diameter is defined as a particle size at which a cumulative frequency is 50% on the volume basis in a frequency distribution and can be calculated by using a wet process on a laser diffraction particle size distribution analyzer. More specifically, a substance to be measured is dispersed into water and the particle size is then measured on the analyzer. Examples of the laser diffraction particle size distribution analyzer include Mastersizer 2000 (manufactured by Malvern Instruments).

In another preferred embodiment, compositions of the present invention further comprise one or more excipients selected from the group consisting of one or more solvents, one or more surfactants and one or more thickeners.

Solvents suitable for use in compositions of the present invention include, but are not limited to, vegetable oils, esters, ketones, aromatic hydrocarbons, and paraffins. Vegetable oils include but are not limited to rapeseed oil, soybean oil, flaxseed oil, corn oil, and olive oil. Esters include but are not limited to benzyl acetate, diisobutyl adipate, diisodecyl adipate, butyl benzoate, dialkyl phthalate, octyl oleate, lauryl oleate, octyldodecyl oleate, and isopropyl myristate. Ketones include but are not limited to, methyl isobutyl ketone, heptanone, octanon, nonanone, cyclohexanone, and acetophenone. Aromatic hydrocarbons include, but are not limited to: alkylbenzenes including, but not limited to, toluene, xylene, ethylbenzene, octadecylbenzene, dialkylbenzenes and trialkylbenzenes; alkylnaphthalene including, but not limited to, methylnaphthalene, dimethylnaphthalene, dodecylnaphthalene and tridecylnaphthalene and phenylxysilylethane, 1-phenyl-1-ethylphenylethane. Paraffins include, but are not limited to, normal paraffin, isoparaffin, cycloparaffin, and liquid paraffin.

In a preferred embodiment, the one or more solvents is selected from the group consisting of heavy aromatic naphtha, a water-insoluble aromatic ester solvent, a morpholine amide of a C8,10 fatty acid and acetyl tributyl citrate.

Commercially available representatives of solvents of the present invention include, but are not limited to: Aromatic 200ND (CAS #64742-94-5; heavy aromatic naphtha available from ExxonMobil); Jeffsol® AG 1700 (a water-insoluble aromatic ester solvent available from Huntsman Corporation; Jeffsol® AG 1700 has a flash point of 106° C., a boiling point of 249° C., a freezing point of −22° C. and a density of 1.01 g/mL); Jeffsol® AG 1730 (a morpholine amide of a C8,10 fatty acid available from Huntsman Corporation); and Citroflex® A-4 (CAS #77-90-7; acetyl tributyl citrate available from Vertellus).

The one or more solvents may be present in compositions of the present invention at a concentration from about 1% to about 30% w/w, preferably from about 10% to about 20% w/w, more preferably from about 12% to about 16% w/w and most preferably at about 14% w/w.

Surfactants suitable for use in compositions of the present invention include, but are not limited to, anionic surfactants and nonionic surfactants. Anionic surfactants include, but are not limited to, alkyl sulfate salts, polyoxyethylene alkylaryl ether sulfate salts, polyoxyethylene arylphenyl ether sulfate salts, naphthalene sulfonate salts and their formalin condensates; alkylnaphthalene sulfonate salts and their formalin condensates; phenyl sulfonate salts; dialkyl sulfosuccinate salts; acyl taurine salt; alkylphosphoric acid salts; polyoxyethylene alkyl ether phosphoric acid salts; polyoxyethylene arylphenyl ether phosphoric acid salts; and salts of styrene-maleic acid copolymer. Nonionic surfactants include, but are not limited to, polyoxyethylene-polyoxypropylene block copolymer, polyoxyethylene alkyl ether, polyoxyethylene aryl phenyl ether, sorbitan fatty acid ester, sucrose fatty acid ester, and alkyl polyglycoside.

In a preferred embodiment, the one or more surfactants is selected from the group consisting of an alkylphenol ethoxylate free nonionic wetter and dispersant package, an acrylic graft copolymer, a poly(ethylene oxide)-poly(propylene oxide)-poly(ethylene oxide) block copolymer having an average molecular weight of 5900 and a hydrophile weight percentage of 40%, a poly(ethylene oxide)-poly(propylene oxide)-poly(ethylene oxide) block copolymer having an average molecular weight of 3650 and a hydrophile weight percentage of 20%, calcium salt of 4-(4,6,8-trimethyl-3-nonanyl)benzenesulfate, a sorbitan monooleate ethoxylate, polyvinyl alcohol, an alkylphenol ethoxylate free nonionic wetter and dispersant package and PEG-10 tallate.

Commercially available representatives of surfactants of the present invention include but are not limited to: Atlox® 4894 (an alkylphenol ethoxylate free nonionic wetter and dispersant package available from Croda Americas LLC), Atlox® 4913 (a proprietary acrylic graft copolymer available from Croda Americas LLC) Pluronic® P104 (a poly (ethylene oxide)-poly(propylene oxide)-poly(ethylene oxide) block copolymer available from BASF Corporation), Pluronic® P104 has an average molecular weight of 5900 and a hydrophile weight percentage of 40%; Pluronic® L92 (a poly(ethylene oxide)-poly(propylene oxide)-poly(ethylene oxide) block copolymer available from BASF Corporation), Pluronic® L92 has an average molecular weight of 3650 and a hydrophile weight percentage of 20%, Toximul® SEE-341 (CAS #9005-65-6; a sorbitan monooleate ethoxylate available from Stepan), Ninate® 401-A (CAS #68953-96-8,4-4,6,8-Trimethyl-3-nonanyl)benzenesulfate, calcium salt available from Stepan) and Ninex® MT-610 (CAS #61791-00-2; PEG-10 tallate available from Stepan).

The one or more surfactants may be present in compositions of the present invention at a concentration from about 1% to about 20% w/w, preferably from about 1% to about 10% w/w, more preferably from about 1% to about 7% w/w and most preferably at about 1%, 2%, 3%, 5% or 7% w/w.

Thickeners suitable for use in the present invention include, but are not limited to, natural polysaccharides, cellulose derivatives, water-soluble synthetic polymers and mineral fine powders. Natural polysaccharides include, but are not limited to, xanthan gum, welan gum, gellan gum, guar gum, locust bean gum, arabic gum, carrageenan, pectin, and sodium alginate. Cellulose derivatives include, but are not limited to, methyl cellulose, carboxymethyl cellulose, carboxymethyl cellulose sodium, hydroxyethyl cellulose, hydroxypropyl cellulose, and hydroxypropyl methylcellulose. Water-soluble synthetic polymers include, but are not limited to, polyvinyl alcohol, polyvinylpyrrolidone, polyacrylate salts, and derivatives thereof. Mineral fine powders include, but are not limited to, colloidal hydrous aluminum silicate, colloidal hydrous magnesium silicate, aluminum magnesium silicate, and silica.

In a preferred embodiment, the one or more thickeners is selected from the group consisting of a xanthan gum, a guar gum, a hydroxypropyl guar.

Commercially available representatives of thickeners of the present invention include, but are not limited to: Rhodopol® 50 MC (CAS #11138-66-2; a xanthan gum and is available from Solvay), Rhodopol® 50 MC has a bulk density of 750 to 850 kg/m³ and Kelzan® BT (a xanthan gum available from CP Kelco).

The one or more thickeners may be present in compositions of the present invention at a concentration from about 0.01% to about 2% w/w, preferably from about 0.1% to about 2% w/w, more preferably from about 0.1% to about 0.4% w/w and most preferably at about 0.19%, 0.38% or 0.40% w/w.

In a more preferred embodiment, the present invention is directed to an aqueous composition comprising epyrifenacil, preferably at about 1% w/w, flumioxazin, preferably at about 5% w/w, pyroxasulfone, preferably at about 5% w/w, an alkylphenol ethoxylate free nonionic wetter and dispersant package preferably from about 1% to about 5% w/w, an acrylic graft copolymer, preferably from about 2% to about 3% w/w, heavy aromatic naphtha, preferably at about 14% w/w, a poly(ethylene oxide)-poly(propylene oxide)-poly(ethylene oxide) block copolymer having an average molecular weight of 3650 and a hydrophile weight percentage of 20%, preferably at about 2% w/w, xanthan gum, preferably at about 0.19% w/w and water and optionally comprising, a silicone-based antifoaming agent, preferably from about 0.2% to about 0.3% w/w, magnesium aluminum silicate, preferably at about 0.4% w/w, 19.3% 1,2-benzisothiazolin-3-one, preferably at about 0.2% w/w and propylene glycol, preferably at about 4% w/w.

In a most preferred embodiment, the present invention is directed to an aqueous composition comprising:
  about 1.09% w/w epyrifenacil;
  about 4.76% w/w flumioxazin;
  about 4.93% w/w pyroxasulfone;
  about 14.35% w/w heavy aromatic naphtha;
  about 1.44% w/w of an alkylphenol ethoxylate free nonionic wetter and dispersant package;
  about 2.87% w/w of an acrylic graft copolymer;
  about 0.19% w/w of a silicone-based antifoaming agent;
  about 0.38% w/w magnesium aluminum silicate;
  about 0.19% w/w of 19.3% 1,2-benzisothiazolin-3-one;
  about 4.31% w/w propylene glycol;
  about 1.91% w/w of a poly(ethylene oxide)-poly(propylene oxide)-poly(ethylene oxide) block copolymer having an average molecular weight of 3650 and a hydrophile weight percentage of 20%;
  about 0.19% w/w xanthan gum; and
  water.

In a most preferred embodiment, the present invention is directed to an aqueous composition comprising:
  about 1.09% w/w epyrifenacil;
  about 4.74% w/w flumioxazin;
  about 4.91% w/w pyroxasulfone;
  about 14.31% w/w heavy aromatic naphtha;
  about 4.77% w/w of an alkylphenol ethoxylate free nonionic wetter and dispersant package;
  about 2.39% w/w of an acrylic graft copolymer;
  about 0.29% w/w of a silicone-based antifoaming agent;
  about 0.38% w/w magnesium aluminum silicate;
  about 0.19% w/w of 19.3% 1,2-benzisothiazolin-3-one;
  about 4.29% w/w propylene glycol;
  about 1.91% w/w of a poly(ethylene oxide)-poly(propylene oxide)-poly(ethylene oxide) block copolymer having an average molecular weight of 3650 and a hydrophile weight percentage of 20%;
  about 0.19% w/w xanthan gum; and
  water.

In another embodiment, the present invention is directed to methods of controlling weeds comprising applying a composition of the present invention to the weeds or an area in need of weed control.

In another preferred embodiment, the compositions of the present invention may be applied sequentially or concurrently with glyphosate, glufosinate, dicamba, 2,4-D and mixtures thereof to control weeds.

The compositions of the present invention can be applied to any environment in need of weed control. The environment in need of weed control may include any area that is desired to have a reduced number of weeds or to be free of weeds. For example, the composition can be applied to an area used to grow crop plants, such as a field, orchard, or vineyard. For example, compositions and methods of the present invention can be applied to areas where soybeans, corn, peanuts, and cotton are growing. In a preferred embodiment, the composition is applied in an area where a broadleaf crop (soybean, cotton, peanut, orchard, vineyard, forages) is growing. The compositions of the present invention can also be applied to non-agricultural areas in need of weed control such as lawns, golf courses, or parks.

The compositions of the present invention can be applied by any convenient means. Those skilled in the art are familiar with the modes of application that include foliar applications such as spraying, chemigation (a process of applying the composition through the irrigation system), by granular application, or by impregnating the composition on fertilizer.

The compositions of the present invention can be prepared as concentrate formulations or as ready-to-use formulations. The compositions can be tank mixed.

The compositions and methods of the present invention can be applied successfully to crop plants and weeds that are resistant to glyphosate, glufosinate, or other herbicides. The composition and methods can also be applied to areas where genetically modified crops ("GMOs") or non-GMO crops are growing. The term "GMO crops" as used herein refers to crops that are genetically modified.

The compositions and methods of the present invention may be used for pre-emergence control of weeds.

The compositions and methods of the present invention may be used to increase the speed of glyphosate control of weeds during post-emergence application.

The compositions and methods of the present invention may be used to increase the speed of glyphosate control of weeds during a burn-down application.

As used herein "burn-down" refers to applying a pesticide to weeds post-emergence but prior to emergence of crops.

Throughout the application, the singular forms "a," "an," and "the" include plural reference unless the context clearly dictates otherwise.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

These representative embodiments are in no way limiting and are described solely to illustrate some aspects of the invention.

Further, the following examples are offered by way of illustration only and not by way of limitation.

EXAMPLE

Example 1—Preparation of Aqueous Composition of the Present Invention Method 4.76 parts by weight of flumioxazin and 4.93 parts by weight of pyroxasulfone were mixed together in a formulation containing 1.44 parts by weight of Atlox® 4894, 2.87 parts by weight of Atlox® 4913, 0.1 parts by weight of Xiameter® AFE 0300, 0.38 parts by weight of Veegum® R and 20.34 parts by weight of water to form a suspension concentrate composition. 1.09 parts by weight of epyrifenacil was dispersed in 14.35 parts by weight of aromatic 200 ND in the presence of 1.91 parts by weight of Pluronic® L92 and 21.9 parts by weight of water to form an emulsion-in-water composition. The suspension concentrate formulation and emulsion-in-water composition were then homogenized in the presence of 0.19 parts by weight of Kelzan® BT, 0.19 parts by weight of Proxel® GXL, 4.31 parts by weight of propylene glycol, 0.09 parts by weight of Xiameter® AFE 0300 and 21.15 parts by weight of water to form a suspo-emulsion composition.

Xiameter® AFE 0300 is a silicone-based antifoaming agent available from Dow Corning Corporation.

Veegum® R (CAS #1302-78-9 or #12199-37-0) is magnesium aluminum silicate available from Vanderbilt Minerals, LLC.

Proxel® GXL is 19.3% 1,2-benzisothiazolin-3-one available from Lonza.

Results

The suspo-emulsion composition was physically and chemically stable upon storage and was physically compatible with high electrolyte systems.

Example 2—Preparation of an Additional Aqueous Composition of the Present Invention Method 4.74 parts by weight of flumioxazin and 4.91 parts by weight of pyroxasulfone were mixed together in a formulation containing 4.77 parts by weight of Atlox® 4894, 2.39 parts by weight of Atlox® 4913, 0.2 parts by weight of Xiameter® AFE 0300, 0.38 parts by weight of Veegum® R and 24.44 parts by weight of water to form a suspension concentrate composition. 1.09 parts by weight of epyrifenacil was dispersed in 14.31 parts by weight of aromatic 200ND in the presence of 1.91 parts by weight of Pluronic® L92 and 18 parts by weight of water to form an emulsion-in-water composition. The suspension concentrate formulation and emulsion-in-water composition were then homogenized in the presence of 0.19 parts by weight of Kelzan® BT, 0.19 parts by weight of Proxel® GXL, 4.29 parts by weight of propylene glycol, 0.09 parts by weight of Xiameter® AFE 0300 and 18.1 parts by weight of water to form a suspo-emulsion composition.

Result

The suspo-emulsion composition was physically and chemically stable upon storage and was physically compatible with high electrolyte systems.

Example 3—Preparation of an Additional Aqueous Composition of the Present Invention Method A suspo-emulsion composition was prepared according to the procedures of Example 2, above, except that Rhodopol® 50 MC was used instead of Kelzan® BT.

Result

The suspo-emulsion composition was physically and chemically stable upon storage and was physically compatible with high electrolyte systems.

What is claimed is:

1. An aqueous composition comprising epyrifenacil, flumioxazin, pyroxasulfone and a poly(ethylene oxide)-poly(propylene oxide)-poly(ethylene oxide) block copolymer having an average molecular weight of 3650 and a hydrophile weight percentage of 20%.

2. The composition of claim 1, further comprising one or more solvents.

3. The composition of claim 2, wherein the one or more solvents is selected from the group consisting of heavy aromatic naphtha, a water-insoluble aromatic ester solvent, a morpholine amide of a C8-10 fatty acid and acetyl tributyl citrate.

4. The composition of claim 1, further comprising one or more thickeners.

5. The composition of claim 4, wherein the one or more thickeners is selected from the group consisting of aluminum magnesium silicate, a xanthan gum, a guar gum and a hydroxypropyl guar.

6. The composition of claim 1, wherein the composition has a pH from about 5 to about 8.

7. A method of controlling a weed comprising applying the composition of claim 1 to the weed or an area in need of weed control.

8. The method of claim 7, wherein the composition of claim 1 is applied sequentially or concurrently with a second composition comprising a compound selected from the group consisting of glyphosate, glufosinate, dicamba, 2,4-D and mixtures thereof.

9. An aqueous suspo-emulsion composition comprising epyrifenacil, flumioxazin, pyroxasulfone, one or more solvents, a poly(ethylene oxide)-poly(propylene oxide)-poly(ethylene oxide) block copolymer having an average molecular weight of 3650 and a hydrophile weight percentage of 20% and one or more thickeners.

10. The aqueous composition of claim 9, wherein:
epyrifenacil is at a concentration from about 0.1% to about 10% w/w;
flumioxazin is at a concentration from about 1% to about 10% w/w;
pyroxasulfone is at a concentration from about 1% to about 10% w/w;
the one or more solvents is at a concentration from about 1% to about 30% w/w;
the poly(ethylene oxide)-poly(propylene oxide)-poly(ethylene oxide) block copolymer having an average molecular weight of 3650 and a hydrophile weight percentage of 20% is at a concentration from about 1% to about 20% w/w;
the one or more thickeners is at a concentration from about 0.01% to about 1% w/w, wherein w/w denotes weight by total weight of the composition.

11. The aqueous composition of claim 10, wherein:
epyrifenacil is at a concentration from about 0.5% to about 5% w/w;
flumioxazin is at a concentration from about 2% to about 8% w/w;
pyroxasulfone is at a concentration from about 2% to about 8% w/w;
the one or more solvents is at a concentration from about 10% to about 20% w/w;
the poly(ethylene oxide)-poly(propylene oxide)-poly(ethylene oxide) block copolymer having an average molecular weight of 3650 and a hydrophile weight percentage of 20% is at a concentration from about 1% to about 10% w/w;
the one or more thickeners is at a concentration from about 0.1% to about 1% w/w,
wherein w/w denotes weight by total weight of the composition.

12. An aqueous composition comprising epyrifenacil, flumioxazin, pyroxasulfone, an alkylphenol ethoxylate free nonionic wetter and dispersant, an acrylic graft copolymer, heavy aromatic naphtha, a poly(ethylene oxide)-poly(propylene oxide)-poly(ethylene oxide) block copolymer having an average molecular weight of 3650 and a hydrophile weight percentage of 20%, xanthan gum and water.

13. The composition of claim 12, wherein:
epyrifenacil is at a concentration of about 1% w/w;
flumioxazin is at a concentration of about 5% w/w;
pyroxasulfone is at a concentration of about 5% w/w;
the alkylphenol ethoxylate free nonionic wetter and dispersant is at a concentration from about 1% to about 5% w/w;
the acrylic graft copolymer is at a concentration from about 2% to about 3% w/w;
heavy aromatic naphtha is at a concentration of about 14% w/w;
the poly(ethylene oxide)-poly(propylene oxide)-poly(ethylene oxide) block copolymer having an average molecular weight of 3650 and a hydrophile weight percentage of 20% is at a concentration of about 2% w/w; and
xanthan gum is at a concentration of about 0.19% w/w,
wherein w/w denotes weight by total weight of the composition.

14. The composition of claim 12, further comprising a silicone-based antifoaming agent, magnesium aluminum silicate, 19.3% 1, 2-benzisothiazolin-3-one and propylene glycol.

15. The composition of claim 14, wherein:
the silicone-based antifoaming agent is at a concentration from about 0.2% to about 0.3 w/W;
magnesium aluminum silicate is at a concentration of about 0.4% w/w;
19.3% 1, 2-benzisothiazolin-3-one is at a concentration of about 0.2% w/w; and
propylene glycol is at a concentration of about 4% w/w.

* * * * *